United States Patent
Haener et al.

(10) Patent No.: US 11,829,737 B2
(45) Date of Patent: Nov. 28, 2023

(54) USING COMPILER OPTIMIZATION TO ENABLE AUTOMATIC GENERATION OF COMBINATIONAL CIRCUITS FROM HIGH-LEVEL PROGRAMS

(71) Applicant: Microsoft Technology Licensing, LLC, Redmond, WA (US)

(72) Inventors: Thomas Haener, Bellevue, WA (US); Mathias Soeken, Lausanne (CH); Martin Roetteler, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/745,266

(22) Filed: Jan. 16, 2020

(65) Prior Publication Data

US 2021/0224049 A1 Jul. 22, 2021

(51) Int. Cl.
*G06F 9/44* (2018.01)
*G06F 9/455* (2018.01)
*G06F 9/445* (2018.01)
*G06F 8/41* (2018.01)
*G06N 10/00* (2022.01)

(52) U.S. Cl.
CPC .............. *G06F 8/443* (2013.01); *G06F 8/433* (2013.01); *G06F 8/447* (2013.01); *G06N 10/00* (2019.01)

(58) Field of Classification Search
CPC .......... G06F 8/443; G06F 8/433; G06F 8/447; G06N 10/00
See application file for complete search history.

(56) References Cited

U.S. PATENT DOCUMENTS

| | | | |
|---|---|---|---|
| 7,100,164 B1 | 8/2006 | Edwards | |
| 8,601,413 B2 | 12/2013 | Yasunaka | |
| 8,806,403 B1 | 8/2014 | Denisenko et al. | |
| 9,081,930 B1 | 7/2015 | Neuendorffer et al. | |
| 10,664,249 B2* | 5/2020 | Amy | G06N 10/00 |
| 11,010,145 B1* | 5/2021 | Smith | G06N 10/00 |
| 11,243,248 B2* | 2/2022 | Liu | G06N 10/00 |
| 2017/0147303 A1* | 5/2017 | Amy | G06F 8/436 |
| 2018/0181685 A1* | 6/2018 | Roetteler | G09C 1/00 |
| 2018/0260245 A1* | 9/2018 | Smith | G06F 9/542 |
| 2019/0164076 A1* | 5/2019 | Kim | G06N 10/00 |
| 2019/0220782 A1* | 7/2019 | Chen | G06N 10/00 |

(Continued)

FOREIGN PATENT DOCUMENTS

CN 110187885 A * 8/2019 ............... G06F 8/42

OTHER PUBLICATIONS

X. Fu, eQASM: An Executable Quantum Instruction Set Architecture, 2019, pp. 1-14. https://arxiv.org/pdf/1808.02449.pdf (Year: 2019).*

(Continued)

*Primary Examiner* — Mongbao Nguyen
(74) *Attorney, Agent, or Firm* — Klarquist Sparkman, LLP

(57) ABSTRACT

This application concerns quantum computing devices and, more specifically, techniques for compiling a high-level description of a quantum program to be implemented in a quantum-computing device into a lower-level program that is executable by a quantum-computing device, where the high-level description of the quantum program to be implemented in a quantum-computing device supports at least one of loops and/or branches.

19 Claims, 10 Drawing Sheets

(56) References Cited

U.S. PATENT DOCUMENTS

| | | | | |
|---|---|---|---|---|
| 2020/0116784 | A1* | 4/2020 | Liu | G01R 31/31702 |
| 2020/0272926 | A1* | 8/2020 | Chaplin | G06N 10/00 |
| 2021/0064350 | A1* | 3/2021 | Cao | G06F 8/447 |
| 2021/0216898 | A1* | 7/2021 | Huffman | G06F 11/32 |
| 2021/0286601 | A1* | 9/2021 | Fitzsimons | G06F 8/72 |

OTHER PUBLICATIONS

Mathias Soeken, Programming Quantum Computers Using Design Automation, 2018, pp. 1-10. https://www.microsoft.com/en-us/research/uploads/prod/2018/03/1803.01022.pdf (Year: 2018).*

Robert S. Smith, A practical Quantum Instruction Set Architecture, 2017, pp. 1-15. https://arxiv.org/pdf/1608.03355.pdf (Year: 2017).*

Andrew W. Cross, Open Quantum Assembly Language, 2017, pp. 1-24. https://arxiv.org/pdf/1707.03429.pdf (Year: 2017).*

Damian S. Steiger, Project Q: An Open Source Software Framework for Quantum Computing, 2018, pp. 1-13. https://arxiv.org/pdf/1612.08091.pdf (Year: 2018).*

Thomas Haner, A software methodology for compiling quantum programs, 2016, pp. 1-14. 1-14 https://iopscience.iop.org/article/10.1088/2058-9565/aaa5cc/pdf (Year: 2016).*

Jingyue Wu, gpucc: An Open-Source GPGPU Compiler, 2016, pp. 105-115. https://ieeexplore.ieee.org/stamp/stamp.jsp?tp=&arnumber=7559536 (Year: 2016).*

Krysta Svore, Q#: Enabling Scalable Quantum Computing and Development with a High-level DSL, 2018, pp. 1-10. https://dl.acm.org/doi/pdf/10.1145/3183895.3183901 (Year: 2018).*

Alex Parent, Reversible circuit compilation with space constraints, 2015, pp. 1-32. https://arxiv.org/abs/1510.00377 (Year: 2015).*

Qijing Huang, The Effect of Compiler Optimizations on High-Level Synthesis-Generated Hardware, 2015, pp. 1-26. https://janders.eecg.utoronto.ca/pdfs/a14-huang.pdf (Year: 2015).*

Amy et al., "Verified Compilation of Space-Efficient Reversible Circuits," *Int'l Conf. Computer-Aided Verification*, 24 pp. (Jul. 2017).

Canis et al., "LegUp: An Open Source High-Level Synthesis Tool for FPGA-Based Processor/Accelerator Systems," *ACM Trans. on Embedded Computing Systems*, vol. 1, Issue 1, 25 pp. (Jul. 2012).

Guo et al., "A Compiler Intermediate Representation for Reconfigurable Fabrics," *Int'l Journal of Parallel Programming*, vol. 36, No. 5, pp. 493-520 (Sep. 2008).

Nepomnyashchiy et al., "The VLSI High-Level Synthesis for Building Onboard Spacecraft Control Systems," *Proc. of the Scientific-Practical Conf.*, pp. 229-238 (Dec. 2017).

Svore et al., "Toward a Software Architecture for Quantum Computing Design Tools," *Int'l Workshop on Quantum Programming Languages*, pp. 127-144 (Jul. 2004).

"International Search Report & Written Opinion Issued in PCT Application No. PCT/US20/064983", dated Apr. 12, 2021, 8 Pages.

Khammassi, et al., "cQASM v1.0: Towards a Common Quantum Assembly Language", In Repository of arXiv:1805.09607v1, May 24, 2018, 8 Pages.

Javadiabhari, et al., "ScaffCC: Scalable Compilation and Analysis of Quantum Programs", In Journal of Parallel Computing, vol. 45, Jun. 1, 2015, pp. 2-17.

* cited by examiner

```
#include <array>
#include <utility>
include <tuple> extern int MAJ3(int, int, int);
extern int XOR3(int, int, int);

namespace
{
std::pair<int, int> full_adder(int a, int b, int c)
{
    return {XOR3(a, b, c), MAJ3(a, b, c)};
} template<class IntArray>
auto ripple_carry_adder(IntArray const& as, IntArray const& bs, int carry)
{
    constexpr auto N = std::tuple_size<IntArray>::value;
    std::array<int, N + 1> sum;
    for (int i = 0; i < N; ++i)
    {
        std::tie(sum[i], carry) = full_adder(as[i], bs[i], carry);
    }
    sum[N] = carry;
    return sum;
}
} int main()
{
    std::array<int, 5> as{1, 2, 3, 4, 5};
    std::array<int, 5> bs{6, 7, 8, 9, 10};
    auto sum = ripple_carry_adder( as, bs, 0 );

return sum[5];
}
```

```
define dso_local i32 @main() local_unnamed_addr #0 personality i32 (....)*
@__gxx_personality_v0 {
  %1 = tail call i32 @_Z4XOR3iii(i32 1, i32 6, i32 0), !noalias !2
  %2 = tail call i32 @_Z4MAJ3iii(i32 1, i32 6, i32 0), !noalias !2
  %3 = tail call i32 @_Z4XOR3iii(i32 2, i32 7, i32 %2), !noalias !2
  %4 = tail call i32 @_Z4MAJ3iii(i32 2, i32 7, i32 %2), !noalias !2
  %5 = tail call i32 @_Z4XOR3iii(i32 3, i32 8, i32 %4), !noalias !2
  %6 = tail call i32 @_Z4MAJ3iii(i32 3, i32 8, i32 %4), !noalias !2
  %7 = tail call i32 @_Z4XOR3iii(i32 4, i32 9, i32 %6), !noalias !2
  %8 = tail call i32 @_Z4MAJ3iii(i32 4, i32 9, i32 %6), !noalias !2
  %9 = tail call i32 @_Z4XOR3iii(i32 5, i32 10, i32 %8), !noalias !2
  %10 = tail call i32 @_Z4MAJ3iii(i32 5, i32 10, i32 %8), !noalias !2
  ret i32 %10
}
```

Receive a high-level description of a quantum program to be implemented in a quantum-computing device, wherein the high-level description of the quantum program to be implemented in a quantum-computing device supports at least one of loops and branches - 1010

Compile at least a portion of the high-level description of the quantum program into a lower-level program that is executable by a quantum-computing device - 1012

FIG. 10

USING COMPILER OPTIMIZATION TO ENABLE AUTOMATIC GENERATION OF COMBINATIONAL CIRCUITS FROM HIGH-LEVEL PROGRAMS

FIELD

This application concerns quantum computing devices.

SUMMARY

Automatic circuit synthesis is used in various domains, ranging from traditional computing to reversible and quantum computing. While it is generally possible to devise circuits implementing specific functionality manually, doing so is an immensely time-consuming task. Further, in the process of manually designing such a circuit, many decisions are made that influence resource requirements and execution speed, and changing these decisions afterwards typically requires a complete reimplementation. Accordingly, it is highly beneficial to use automatic methods to explore different tradeoffs that result from these decisions. Also, the final implementation and the context in which a given circuit is executed influence the cost function with respect to which the circuit is optimized. In such cases, automatic circuit synthesis is a highly desirable and technically beneficial approach, in part due to its scalability.

In certain embodiments of the disclosed technology, a high-level description of a quantum program to be implemented in a quantum-computing device is received. The high-level description of the quantum program to be implemented in a quantum-computing device can support at least one of loops and branches. At least a portion of the high-level description of the quantum program is compiled into a lower-level program that is executable by a quantum-computing device.

In certain implementations, the compiling comprises converting the high-level description of the quantum program to a straight-line program. For example, the compiler can use optimization passes to convert the high-level description of the quantum program to the straight-line program. Or, the compiling can use one or more of constant-folding or reassociation. In further implementations, the method can further comprise converting the straight-line program into a dependency graph. Still further, an intermediate representation of the high-level representation of the quantum program can be traversed in order to convert the straight-line program into the dependency graph. In some implementations, the dependency graph can be translated to a graph of lower-level operations comprising Boolean operations and variables. In some implementations, the lower-level operations are mapped to one or more quantum-computing circuits. As an example, a cost metric can be used to improve a space cost of the mapped one or more quantum-computing circuits. The improvement can also reduce a cost of a reversible circuits in the one or more quantum-computing circuits. In some implementations, the quantum-computing device implements a ripple-carry adder comprising full adders.

BRIEF DESCRIPTION OF THE DRAWINGS

FIG. 5 illustrates code to implement an example adder.

FIG. 6 illustrates code to implement a straight-line version of the adder of FIG. 5.

FIG. 10 is a flow chart 1000 illustrating another method for generating a quantum circuit description according to an embodiment of the disclosed technology.

DETAILED DESCRIPTION

I. General Considerations

Figure 1:
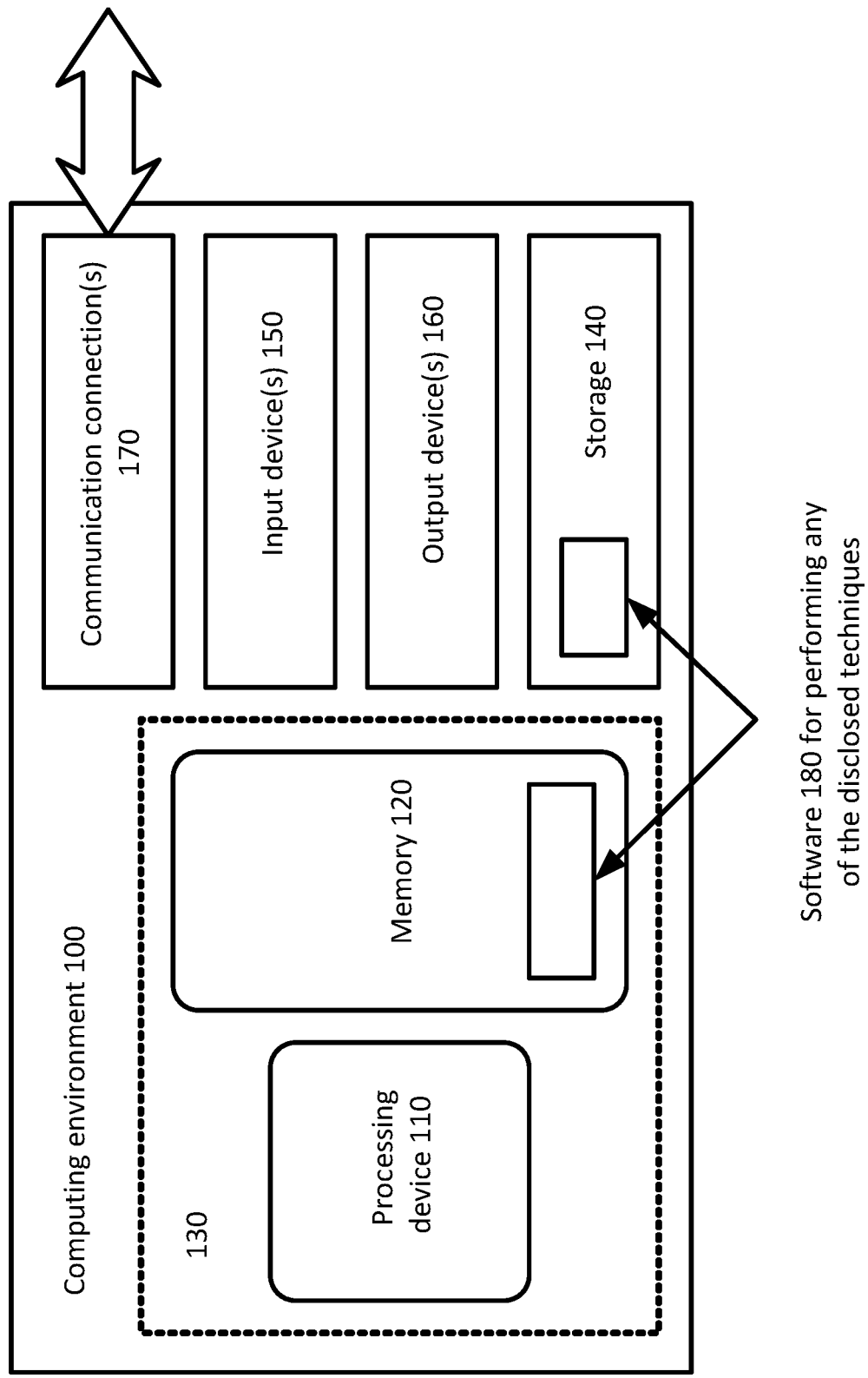
FIG. 1 illustrates a generalized example of a suitable classical computing environment in which aspects of the described embodiments can be implemented.

The disclosed methods, apparatus, and systems should not be construed as limiting in any way. Instead, the present disclosure is directed toward all novel and nonobvious features and aspects of the various disclosed embodiments, alone or in various combinations and subcombinations with one another. Furthermore, any features or aspects of the disclosed embodiments can be used in various combinations and subcombinations with one another. For example, one or more method acts from one embodiment can be used with one or more method acts from another embodiment and vice versa. The disclosed methods, apparatus, and systems are not limited to any specific aspect or feature or combination thereof, nor do the disclosed embodiments require that any one or more specific advantages be present or problems be solved.

Various alternatives to the examples described herein are possible. The various aspects of the disclosed technology can be used in combination or separately. Different embodiments use one or more of the described innovations. Some of the innovations described herein address one or more of the problems noted in the background. Typically, a given technique/tool does not solve all such problems.

As used in this application and in the claims, the singular forms "a," "an," and "the" include the plural forms unless the context clearly dictates otherwise. Additionally, the term "includes" means "comprises." Further, as used herein, the term "and/or" means any one item or combination of any items in the phrase.

III. Detailed Embodiments of the Disclosed Technology

III.A. Introduction

Automatic circuit synthesis is used in various domains, ranging from traditional computing to reversible and quantum computing. While it is generally possible to devise circuits implementing specific functionality manually, doing so is an immensely time-consuming task. Further, in the process of manually designing such a circuit, many decisions are made that influence resource requirements and execution speed, and changing these decisions afterwards typically requires a complete reimplementation.

Therefore, it is beneficial to use automatic methods to explore different tradeoffs that result from these decisions.

Also, the final implementation and the context in which a given circuit is executed influence the cost function with respect to which the circuit is optimized. In such cases, automatic circuit synthesis is a highly desirable and technically beneficial approach, in part due to its scalability.

In the present application, embodiments for achieving these desirable results are described. For example, in one exemplary embodiment, given a straight-line program (e.g., a program that consists only of a sequence of basis operations without branches, loops, etc.), a corresponding dependency graph is built. A dependency graph is a directed acyclic graph, in which vertices represent the operations in the straight-line program, and two operations are connected by an arc, if the computation of one operation uses the result of another one.

Using library implementations for the operations that occur in the dependency graph, it can be expressed in terms of lower-level operations. Iterating this rewrite step ultimately yields a graph comprising Boolean variables and operations (and, in some cases, only Boolean variables and operations).

This graph can then be mapped to a circuit, taking into account potential restrictions of the target hardware. Examples for such restrictions include, for example, reversibility (for reversible or quantum computing), bounds on circuit delay, and/or bounds on area.

For many applications, however, the starting point is not a straight-line program. It is more natural to express high-level operations using branching and loops. A simple example is the addition of two n-bit numbers, which can be implemented using a sequence of n full adder gates that propagate the carry and act on one bit of each input at a time. The most natural representation is thus a loop over the number of bits n, as it can be reused for all operand bit-widths n. FIG. 5 shows a C++ code 500 to implement such an adder. Since all values are known at compile-time, an LLVM-based C++ compiler can generate the straight-line program shown as code 600 in FIG. 6.

In the present application, example embodiments are provided of how to take a general, non-straight-line program and use traditional compiler optimizations to transform it into a straight-line program when this is possible. This technology significantly extends the applicability of traditional methods for quantum circuit synthesis.

III.B. Using Compiler Optimization to Generate Straight-Line Programs

Given a high-level description of a non-straight-line program, and in certain embodiments of the disclosed technology, the method comprises transform the high-level description to a straight-line program from which one can subsequently generate a circuit using traditional circuit synthesis methods. First, it is noted that programs can be executed fastest on traditional (non-quantum) computing hardware if they are in a straight-line form. Therefore, compilers typically feature code optimizations such as loop-unrolling and control-flow-graph simplification, where both optimizations reduce the average number of jumps per actual operation, thereby improving execution speed.

Consequently, one can use said compiler optimizations to turn a given high-level program into a straight-line program, if this is possible. To do so, input parameters (e.g., all input parameters) that influence the control flow should be compile-time known. This includes the bit-width of operands for the addition example mentioned above. Once this information is available at compile-time, aggressive loop-unrolling can be used to remove loops (e.g., all loops). Furthermore, control-flow-graph simplification can be used to turn branches into conditional moves, stores, and loads, where this is possible. Ultimately, after the optimizations have been performed, the program will have been compiled into a low-level representation (the intermediate representation (also referred to as "IR") of the straight-line program) where the loops and if-branches (e.g., all loops and if-branches) have been removed (where possible). Embodiments of the disclosed technology benefit from various improvements in compile-time function evaluation (CTFE) implemented in the compiler (e.g., constexpr in C++). Embodiments of the disclosed technology then traverse the intermediate representation of the straight-line program and directly extract the dependency graph. For general compilers, the intermediate representation will be at a similar level of abstraction as assembly and not yet at the level of Boolean variables and operations. Thus, a final rewrite step is desirable where each non-Boolean operation in the dependency graph is translated to a sequence of Boolean operations. This can be achieved, for example, using optimized library implementations for the instruction set of the intermediate representation. The final dependency graph can then be passed to any Boolean circuit synthesizer, which completes the exemplary process.

III.C. Optimizing Resource Requirements of the Resulting Circuits

As explained above, it has been shown how compiler optimizations can be leveraged in order to turn a high-level program into a straight-line program if loop trip counts (e.g., all loop trip counts) can be inferred during compile-time. In addition, such compiler optimizations can be used to transform the straight-line program to reduce the resource requirements of the resulting circuit.

While some compiler optimizations aim to reduce the number of jumps to improve execution speed, others aim to reduce the number of operations. One example is constant-folding, where certain operations can be performed during compile-time, thus eliminating the need to carry them out at runtime. Having fewer operations in the resulting straight-line program allow one to generate a cheaper circuit (e.g., in terms of either circuit width and/or depth). Thus, compiler optimizations typically not only help to provide support for high-level programming in automatic circuit synthesis, but they also help to reduce the resource requirements (e.g., circuit width and depth, respectively, which can be referred to as space and time, respectively).

Embodiments of the disclosed technology use a sequence of different compiler passes to reduce the number of expensive operations in the given program. If valid for the given application, this may also include re-association. For example, such re-association enables one to rewrite:

$X*=a$ $X*=b$ to just:

$X*=(a\ b)$

With reference to the example above, if a and b can be inferred during compile-time, then constant-folding allows to carry out this operation with just a single multiplication. In turn, this reduces the depth of the resulting circuit by a factor of 2 and, for reversible circuits, reduces the width by a factor of 1.5.

III.D. Improvements and Technical Effects

Previous methods tried to achieve similar goals by different means. Some methods already start with a straight-line program description, and therefore do not support any kind of control flow. Further, some methods either: (i) restrict a known language such that an automatic compilation from a high-level program to a circuit level description is possible; and/or (ii) make use of (embedded) domain-specific languages to generalize implementations to different bit-widths. The main drawback of both methods is that supporting libraries must be re-implemented to either match the restricted language subset or be compatible with the domain-specific language.

Embodiments of the disclosed technology comprise methods that approach those goals in a unique and technically beneficial manner. For example, embodiments of the disclosed technology can be integrated in any existing language that translates into a straight-line program-like IR, thus allowing to reuse optimized library implementations for assembly- or IR-level instructions. Examples are LLVM IR (which can be obtained, e.g., from C and C++), Java Bytecode (which can be obtained from JVM languages such as Java, Groovy, or Scala), or Common Intermediate Language (which can be obtained from .NET languages such as C#, F#, and VisualBasic.NET). As a result, embodiments of the disclosed technology can be implemented very quickly in a broad setting and automatically provide support for high-level control flow, as long as it is possible to convert it to a straight-line program once circuit parameters are known.

IV. Example Embodiments

Figure 7:
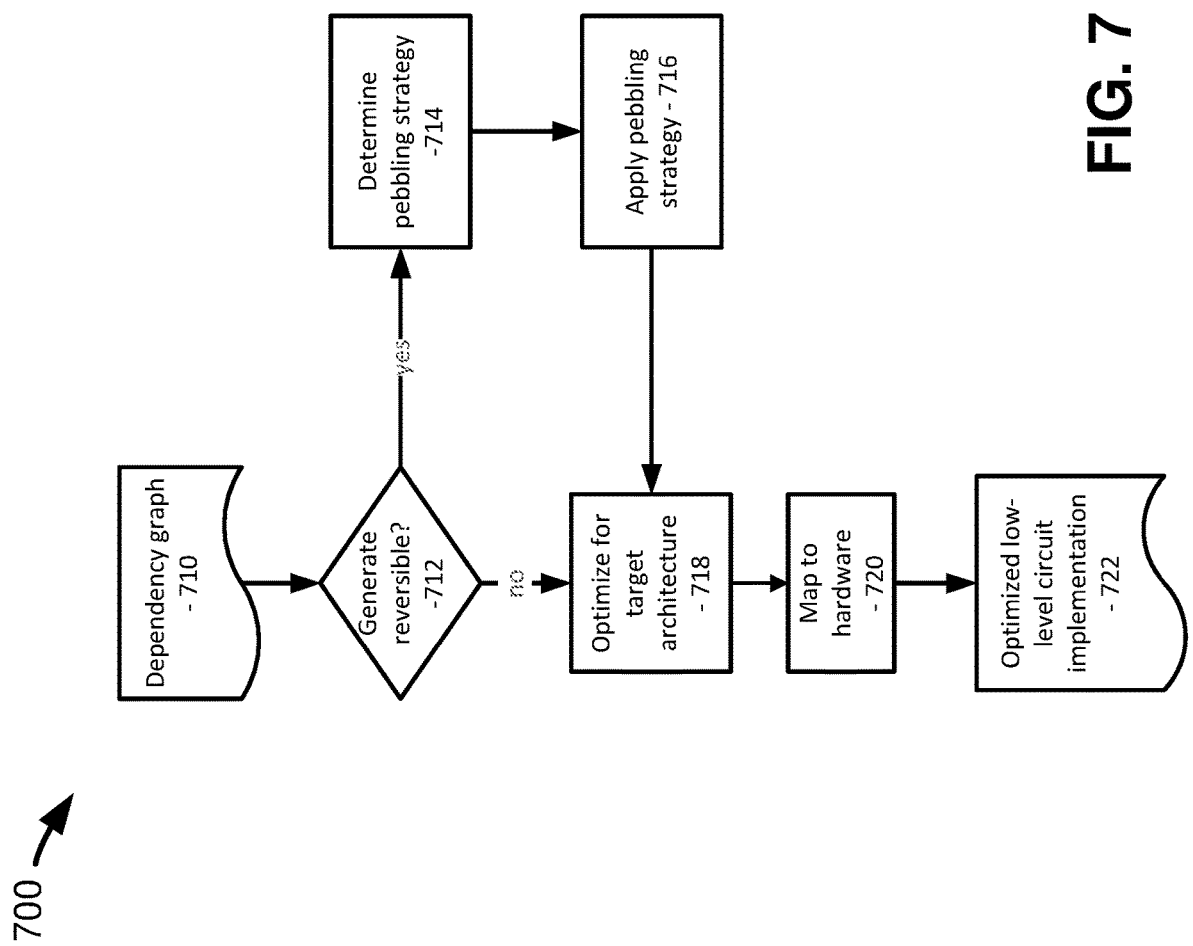
FIGS. 7-9 are flow charts illustrating examples embodiments for generating a quantum circuit description in accordance with embodiments of the disclosed technology.

FIG. 7 is a flow chart 700 illustrating a method for generating a quantum circuit description. The particular operations and sequence of operations should not be construed as limiting, as they can be performed alone or in any combination, subcombination, and/or sequence with one another. Additionally, the illustrated operations can be performed together with one or more other operations.

At 710, a dependency graph representative of the desired quantum circuit is input.

At 712, a determination is made as to whether the dependency graph is reversible, and thus representable by a reversible circuit.

If "yes", then at 714, a pebbling strategy (which quantifies the number of qubits in time and/or space) is determined; and at 716, the determined pebbling strategy is applied. If "no" the method proceeds directly to 718.

At 718, the circuit description is optimized for a target architecture.

At 720, the resulting circuit description is mapped to hardware (e.g., the target hardware).

At 722, the resulting low-level quantum circuit representation is output.

Figure 8:
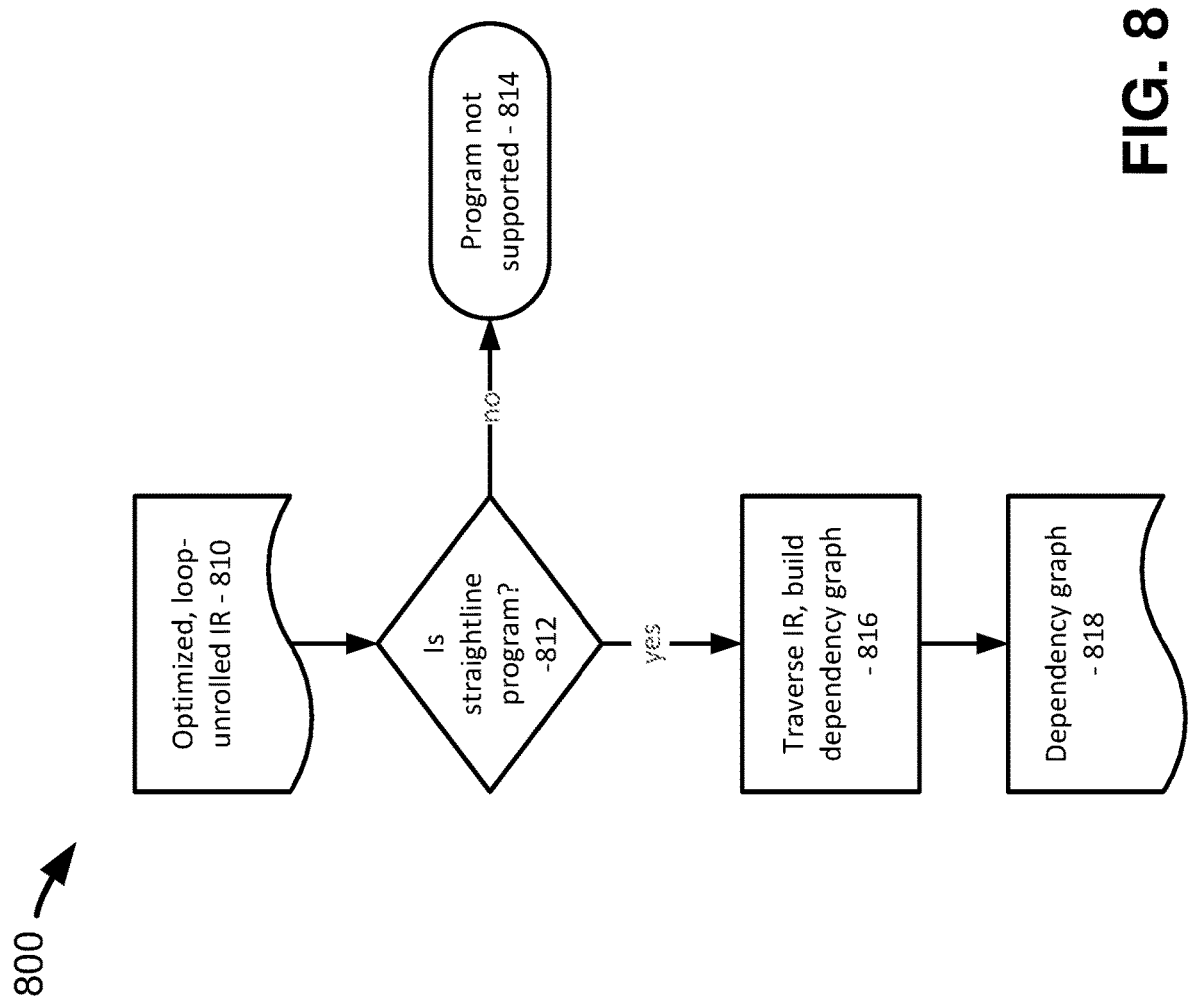

FIG. 8 is a flow chart 800 illustrating another method for generating a quantum circuit description. The particular operations and sequence of operations should not be construed as limiting, as they can be performed alone or in any combination, subcombination, and/or sequence with one another. Additionally, the illustrated operations can be performed together with one or more other operations.

At 810, an optimized intermediate representation (IR) that is representative of the desired functionality of the final quantum circuit is input.

At 812, a determination is made as to whether the IR is a straight-line program or not. If "not", then the method terminates at 814; If "yes", then at 816, the IR is traversed and a dependency graph is built.

At 818, the resulting dependency graph is output.

Figure 9:
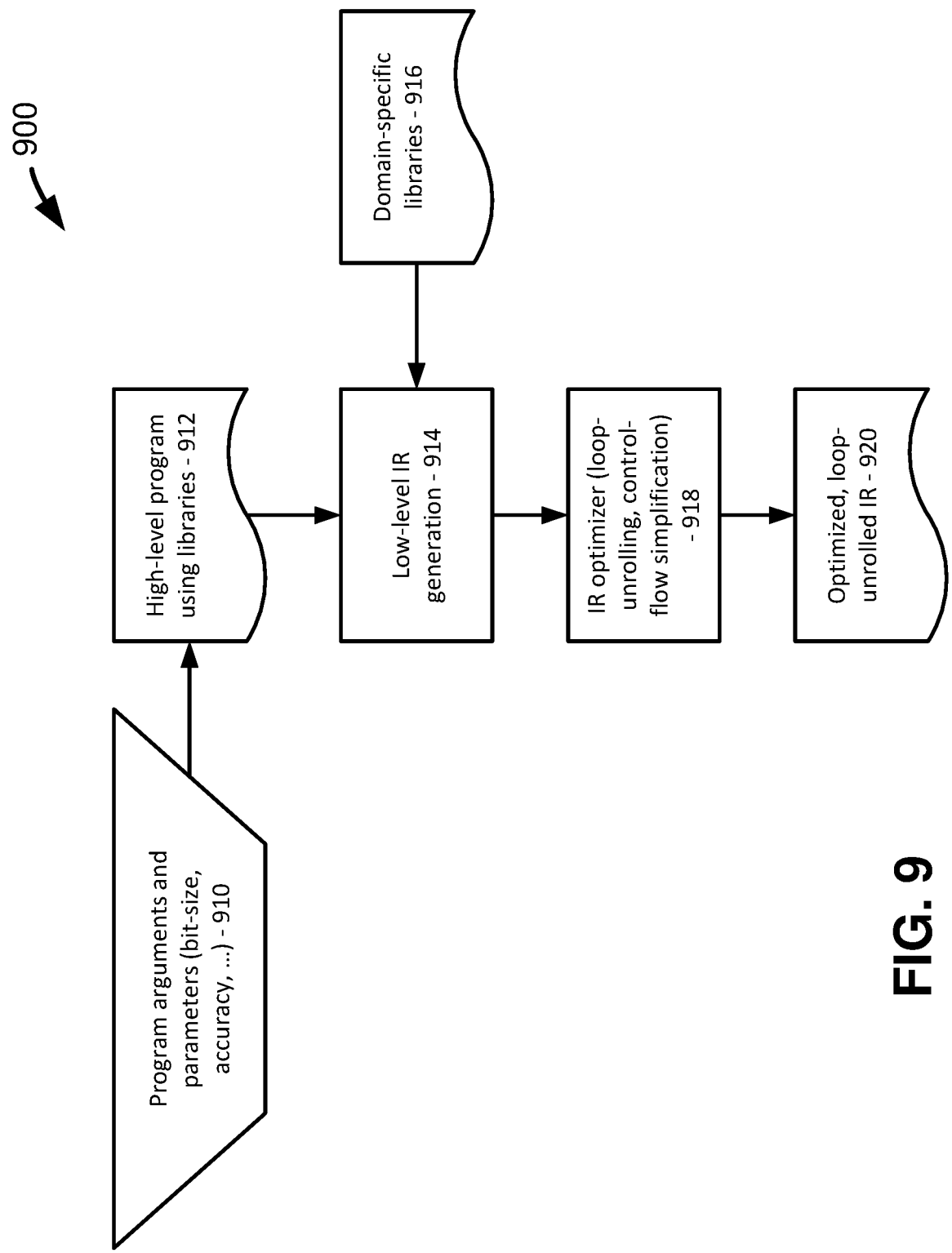

FIG. 9 is a flow chart 900 illustrating a method for generating a loop-unrolled representation in accordance with the disclosed technology. The particular operations and sequence of operations should not be construed as limiting, as they can be performed alone or in any combination, subcombination, and/or sequence with one another. Additionally, the illustrated operations can be performed together with one or more other operations.

910 illustrates a high-level program to be input into a quantum-circuit compiler (e.g., built using one or more libraries). In this example, the input program includes arguments and parameters (e.g., one or more of bit-size, accuracy, etc.,)

At 912, the program (e.g., a high-level program) is input.

At 914, a lower-level intermediate representation ("IR") is generated. In this example, the IR can be generated using one or more domain-specific libraries (as illustrated at 916).

At 918, an optimization process is applied to the IR. For example, in the illustrated embodiment, the optimization comprises applying loop-unrolling and/or control-flow simplification techniques, as described herein.)

At 920, an updated (e.g., optimized) intermediate representation is output.

FIG. 10 is a flow chart 1000 illustrating another method for generating a quantum circuit description. The particular operations and sequence of operations should not be construed as limiting, as they can be performed alone or in any combination, subcombination, and/or sequence with one another. Additionally, the illustrated operations can be performed together with one or more other operations.

At 1010, a high-level description of a quantum program to be implemented in a quantum-computing device is received. In this embodiment, the high-level description of the quantum program to be implemented in a quantum-computing device supports at least one of loops and branches.

At 1012, at least a portion of the high-level description of the quantum program is compiled into a lower-level program that is executable by a quantum-computing device.

In certain implementations, the compiling comprises converting the high-level description of the quantum program to a straight-line program. For example, the compiler can use one or more optimization passes to convert the high-level description of the quantum program to the straight-line program. Or, the compiling can use one or more of constant-folding or reassociation. In further implementations, the method can further comprise converting the straight-line program into a dependency graph. Still further, an intermediate representation of the high-level representation of the quantum program can be traversed in order to convert the straight-line program into the dependency graph. In some implementations, the dependency graph can be translated to a graph of lower-level operations comprising Boolean operations and variables. In some implementations, the lower-level operations are mapped to one or more quantum-computing circuits. As an example, a cost metric can be used to improve a space cost of the mapped one or more quantum-computing circuits. The improvement can also reduce a cost of a reversible circuits in the one or more quantum-computing circuits. In some implementations, the quantum-computing device implements a ripple-carry adder comprising full adders.

V. Example Computing Environments

FIG. 1 illustrates a generalized example of a suitable classical computing environment 100 in which aspects of the described embodiments can be implemented. The computing environment 100 is not intended to suggest any limitation as to the scope of use or functionality of the disclosed technology, as the techniques and tools described herein can be implemented in diverse general-purpose or special-purpose environments that have computing hardware.

With reference to FIG. 1, the computing environment 100 includes at least one processing device 110 and memory 120. In FIG. 1, this most basic configuration 130 is included within a dashed line. The processing device 110 (e.g., a CPU or microprocessor) executes computer-executable instructions. In a multi-processing system, multiple processing devices execute computer-executable instructions to increase processing power. The memory 120 may be volatile memory (e.g., registers, cache, RAM, DRAM, SRAM), non-volatile memory (e.g., ROM, EEPROM, flash memory), or some combination of the two. The memory 120 stores software 180 implementing tools for performing any of the disclosed techniques for operating a quantum computer as described herein. The memory 120 can also store software 180 for synthesizing, generating, or compiling quantum circuits for performing any of the disclosed techniques.

The computing environment can have additional features. For example, the computing environment 100 includes storage 140, one or more input devices 150, one or more output devices 160, and one or more communication connections 170. An interconnection mechanism (not shown), such as a bus, controller, or network, interconnects the components of the computing environment 100. Typically, operating system software (not shown) provides an operating environment for other software executing in the computing environment 100, and coordinates activities of the components of the computing environment 100.

The storage 140 can be removable or non-removable, and includes one or more magnetic disks (e.g., hard drives), solid state drives (e.g., flash drives), magnetic tapes or cassettes, CD-ROMs, DVDs, or any other tangible non-volatile storage medium which can be used to store information and which can be accessed within the computing environment 100. The storage 140 can also store instructions for the software 180 implementing any of the disclosed techniques. The storage 140 can also store instructions for the software 180 for generating and/or synthesizing any of the described techniques, systems, or quantum circuits.

The input device(s) 150 can be a touch input device such as a keyboard, touchscreen, mouse, pen, trackball, a voice input device, a scanning device, or another device that provides input to the computing environment 100. The output device(s) 160 can be a display device (e.g., a computer monitor, laptop display, smartphone display, tablet display, netbook display, or touchscreen), printer, speaker, or another device that provides output from the computing environment 100.

The communication connection(s) 170 enable communication over a communication medium to another computing entity. The communication medium conveys information such as computer-executable instructions or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

As noted, the various methods and techniques for performing any of the disclosed technologies, for controlling a quantum computing device, to perform circuit design or compilation/synthesis as disclosed herein can be described in the general context of computer-readable instructions stored on one or more computer-readable media. Computer-readable media are any available media (e.g., memory or storage device) that can be accessed within or by a computing environment. Computer-readable media include tangible computer-readable memory or storage devices, such as memory 120 and/or storage 140, and do not include propagating carrier waves or signals per se (tangible computer-readable memory or storage devices do not include propagating carrier waves or signals per se).

Various embodiments of the methods disclosed herein can also be described in the general context of computer-executable instructions (such as those included in program modules) being executed in a computing environment by a processor. Generally, program modules include routines, programs, libraries, objects, classes, components, data structures, and so on, that perform particular tasks or implement particular abstract data types. The functionality of the program modules may be combined or split between program modules as desired in various embodiments. Computer-executable instructions for program modules may be executed within a local or distributed computing environment.

Figure 2:
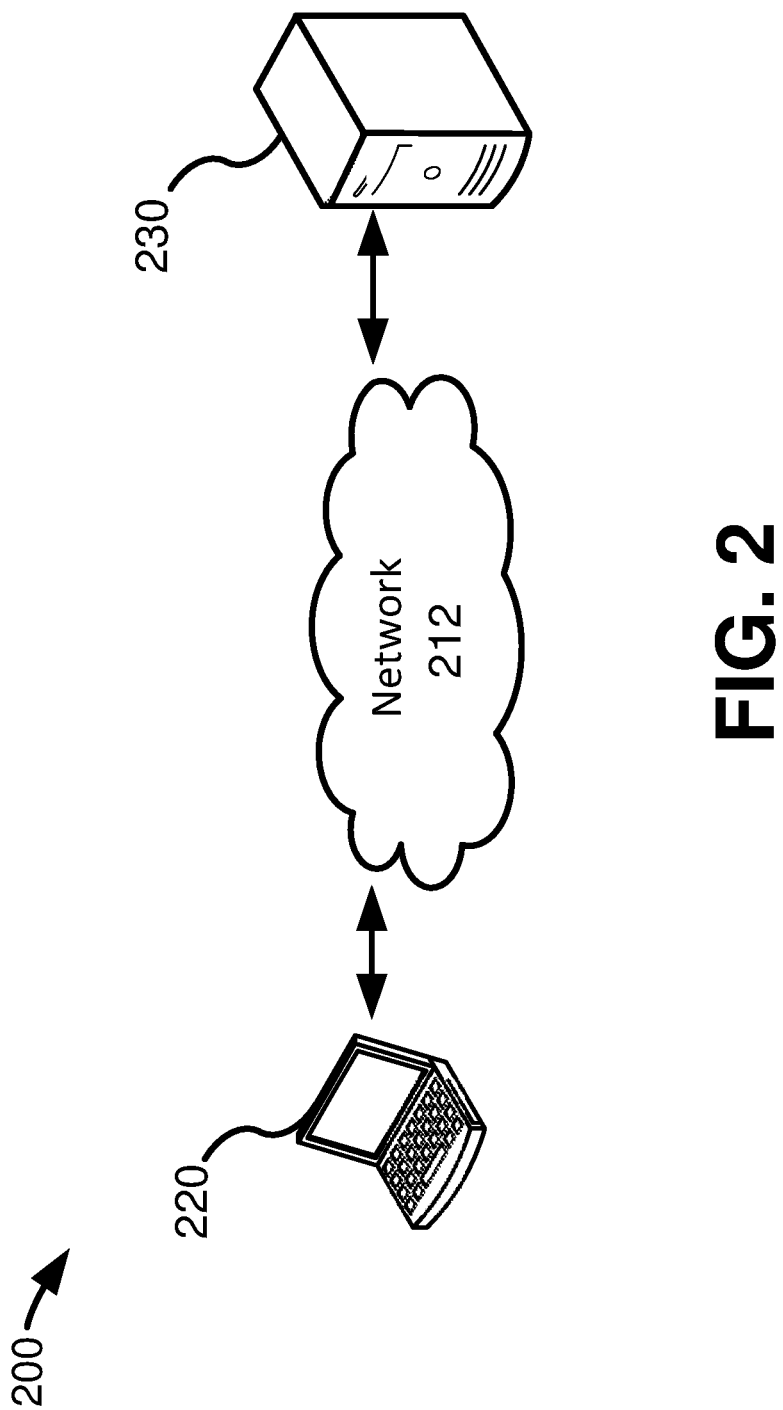
FIG. 2 illustrates an example of a possible network topology (e.g., a client-server network) for implementing a system according to the disclosed technology.

An example of a possible network topology 200 (e.g., a client-server network) for implementing a system according to the disclosed technology is depicted in FIG. 2. Networked computing device 220 can be, for example, a computer running a browser or other software connected to a network 212. The computing device 220 can have a computer architecture as shown in FIG. 1 and discussed above. The computing device 220 is not limited to a traditional personal computer but can comprise other computing hardware configured to connect to and communicate with a network 212 (e.g., smart phones, laptop computers, tablet computers, or other mobile computing devices, servers, network devices, dedicated devices, and the like). Further, the computing device 220 can comprise an FPGA or other programmable logic device. In the illustrated embodiment, the computing device 220 is configured to communicate with a computing device 230 (e.g., a remote server, such as a server in a cloud computing environment) via a network 212. In the illustrated embodiment, the computing device 220 is configured to transmit input data to the computing device 230, and the computing device 230 is configured to implement a technique for controlling a quantum computing device to perform any of the disclosed embodiments and/or a circuit generation/compilation/synthesis technique for generating quantum circuits for performing any of the techniques disclosed herein. The computing device 230 can output results to the computing device 220. Any of the data received from the computing device 230 can be stored or displayed on the computing device 220 (e.g., displayed as data on a graphical user interface or web page at the computing devices 220). In the illustrated embodiment, the illustrated network 212 can be implemented as a Local Area Network ("LAN") using wired networking (e.g., the Ethernet IEEE standard 802.3 or other appropriate standard) or wireless networking (e.g. one of the IEEE standards 802.11a, 802.11b, 802.11g, or 802.11n or other appropriate standard). Alternatively, at least part of the network 212 can be the Internet or a similar public network and operate using an appropriate protocol (e.g., the HTTP protocol).

Figure 3:
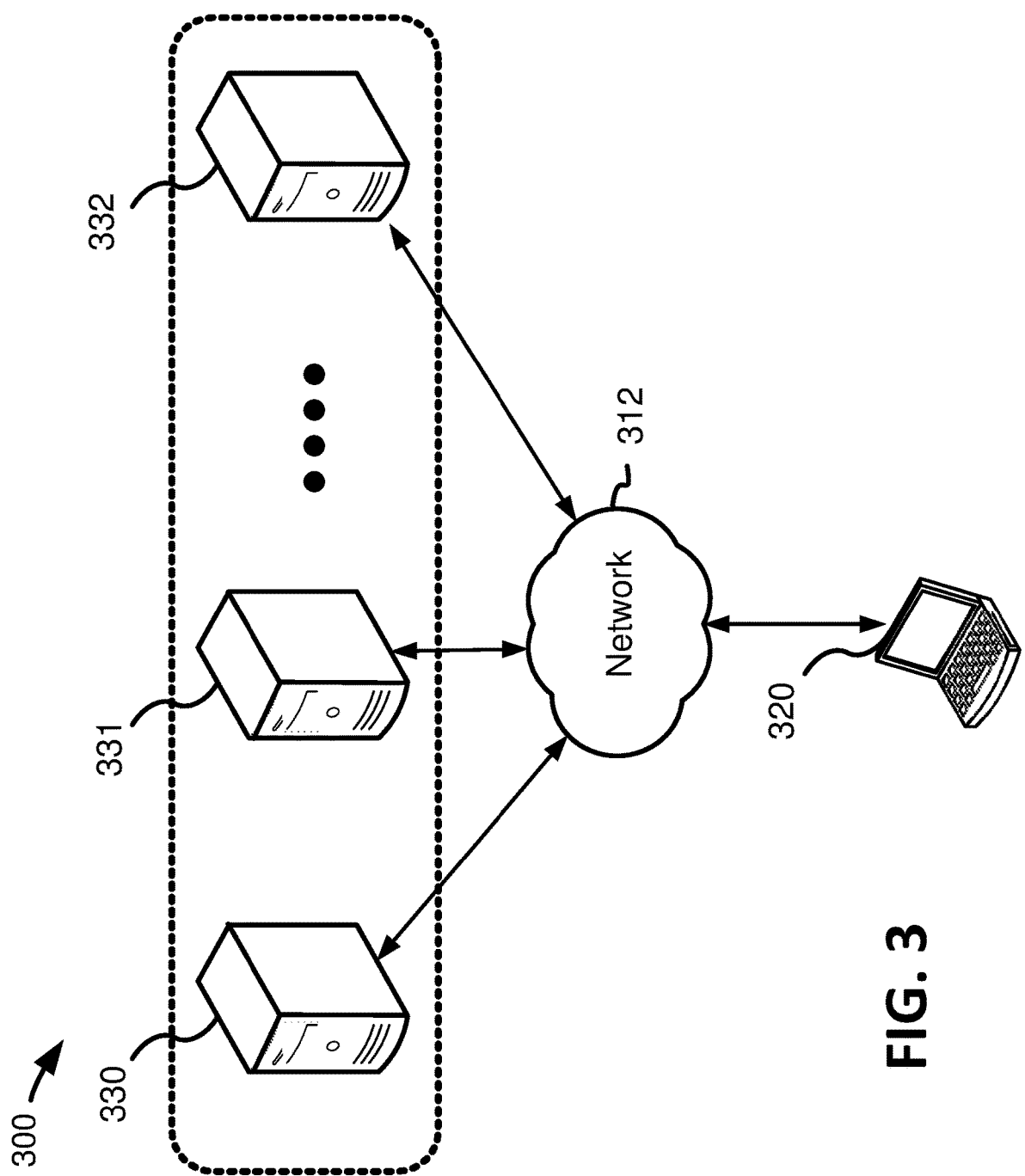
FIG. 3 illustrates another example of a possible network topology (e.g., a distributed computing environment) for implementing a system according to the disclosed technology.

Another example of a possible network topology 300 (e.g., a distributed computing environment) for implementing a system according to the disclosed technology is depicted in FIG. 3. Networked computing device 320 can be, for example, a computer running a browser or other software connected to a network 312. The computing device 320 can have a computer architecture as shown in FIG. 1 and discussed above. In the illustrated embodiment, the computing device 320 is configured to communicate with multiple computing devices 330, 331, 332 (e.g., remote servers or other distributed computing devices, such as one or more servers in a cloud computing environment) via the network 312. In the illustrated embodiment, each of the computing devices 330, 331, 332 in the computing environment 300 is used to perform at least a portion of the disclosed technology and/or at least a portion of the technique for controlling a quantum computing device to perform any of the disclosed embodiments and/or a circuit generation/compilation/synthesis technique for generating quantum circuits for performing any of the techniques disclosed herein. In other words, the computing devices 330, 331, 332 form a distributed computing environment in which aspects of the techniques for performing any of the techniques as disclosed herein and/or quantum circuit generation/compilation/synthesis processes are shared across multiple computing devices. The computing device 320 is configured to transmit input data to the computing devices 330, 331, 332, which are configured to distributively implement such as process, including performance of any of the disclosed methods or creation of any of the disclosed circuits, and to provide results to the computing device 320. Any of the data received from the computing devices 330, 331, 332 can be stored or displayed on the computing device 320 (e.g., displayed as data on a graphical user interface or web page at the computing devices 320). The illustrated network 312 can be any of the networks discussed above with respect to FIG. 2.

Figure 4:
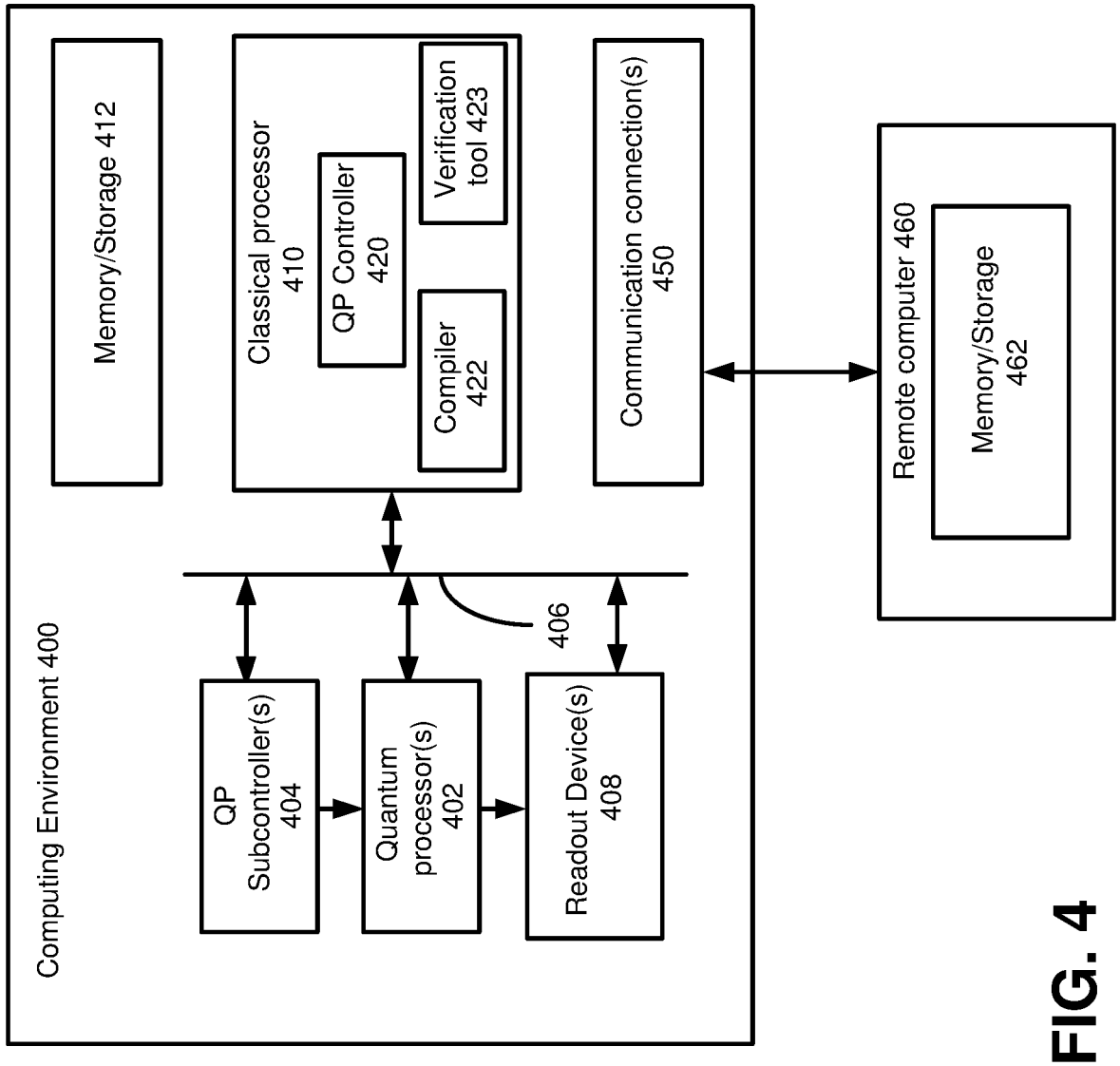
FIG. 4 illustrates an exemplary system for implementing the disclosed technology in which the system includes one or more classical computers in communication with a quantum computing device.

With reference to FIG. 4, an exemplary system for implementing the disclosed technology includes computing environment 400. In computing environment 400, a compiled quantum computer circuit description (including quantum circuits for performing any of the disclosed techniques as disclosed herein) can be used to program (or configure) one or more quantum processing units such that the quantum processing unit(s) implement the circuit described by the quantum computer circuit description.

The environment 400 includes one or more quantum processing units 402 and one or more readout device(s) 408. The quantum processing unit(s) execute quantum circuits that are precompiled and described by the quantum computer circuit description. The quantum processing unit(s) can be one or more of, but are not limited to: (a) a superconducting quantum computer; (b) an ion trap quantum computer; (c) a fault-tolerant architecture for quantum computing; and/or (d) a topological quantum architecture (e.g., a topological quantum computing device using Majorana zero modes). The precompiled quantum circuits, including any of the disclosed circuits, can be sent into (or otherwise applied to) the quantum processing unit(s) via control lines 406 at the control of quantum processor controller 420. The quantum processor controller (QP controller) 420 can operate in conjunction with a classical processor 410 (e.g., having an architecture as described above with respect to FIG. 1) to implement the desired quantum computing process. In the illustrated example, the QP controller 420 further implements the desired quantum computing process via one or more QP subcontrollers 404 that are specially adapted to control a corresponding one of the quantum processor(s) 402. For instance, in one example, the quantum controller 420 facilitates implementation of the compiled quantum circuit by sending instructions to one or more memories (e.g., lower-temperature memories), which then pass the instructions to low-temperature control unit(s) (e.g., QP subcontroller(s) 404) that transmit, for instance, pulse sequences representing the gates to the quantum processing unit(s) 402 for implementation. In other examples, the QP controller(s) 420 and QP subcontroller(s) 404 operate to provide appropriate magnetic fields, encoded operations, or other such control signals to the quantum processor(s) to implement the operations of the compiled quantum computer circuit description. The quantum controller(s) can further interact with readout devices 408 to help control and implement the desired quantum computing process (e.g., by reading or measuring out data results from the quantum processing units once available, etc.)

With reference to FIG. 4, compilation is the process of translating a high-level description of a quantum algorithm into a quantum computer circuit description comprising a sequence of quantum operations or gates, which can include the circuits as disclosed herein (e.g., the circuits configured to perform one or more of the procedures as disclosed herein). The compilation can be performed by a compiler 422 using a classical processor 410 (e.g., as shown in FIG. 4) of the environment 400 which loads the high-level description from memory or storage devices 412 and stores the resulting quantum computer circuit description in the memory or storage devices 412.

In other embodiments, compilation and/or verification can be performed remotely by a remote computer 460 (e.g., a computer having a computing environment as described above with respect to FIG. 1) which stores the resulting quantum computer circuit description in one or more memory or storage devices 462 and transmits the quantum computer circuit description to the computing environment 400 for implementation in the quantum processing unit(s) 402. Still further, the remote computer 400 can store the high-level description in the memory or storage devices 462 and transmit the high-level description to the computing environment 400 for compilation and use with the quantum processor(s). In any of these scenarios, results from the computation performed by the quantum processor(s) can be communicated to the remote computer after and/or during the computation process. Still further, the remote computer can communicate with the QP controller(s) 420 such that the quantum computing process (including any compilation, verification, and QP control procedures) can be remotely controlled by the remote computer 460. In general, the remote computer 460 communicates with the QP controller(s) 420, compiler/synthesizer 422, and/or verification tool 423 via communication connections 450.

In particular embodiments, the environment 400 can be a cloud computing environment, which provides the quantum processing resources of the environment 400 to one or more remote computers (such as remote computer 460) over a suitable network (which can include the internet).

VI. Concluding Remarks

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed technology may be applied, it should be recognized that the illustrated embodiments are examples of the disclosed technology and should not be taken as a limitation on the scope of the disclosed technology.

The invention claimed is:

1. A computer-implemented method, comprising:
receiving a high-level description of a quantum program to be implemented in a quantum-computing device, the high-level description supporting at least one of loops and branches; and
compiling at least a portion of the high-level description of the quantum program into a lower-level program that is executable by the quantum-computing device the compiling comprising:
converting the high-level description of the quantum program to a straight-line program, the straight-line program comprising a sequence of operations without branches or loops,
converting the straight-line program into a dependency graph,
translating the dependency graph to a graph of lower-level operations comprising Boolean operations and variables, and
mapping the lower-level operations to at least one quantum-computing circuit, the mapping comprising taking into account potential restrictions of hardware of the quantum-computing device.

2. The method of claim 1, wherein compiler optimization passes are used to convert the high-level description of the quantum program to the straight-line program.

3. The method of claim 1, wherein the compiling comprises using one or more of constant-folding or reassociation.

4. The method of claim 3, further comprising traversing an intermediate representation of the high-level description of the quantum program in order to convert the straight-line program into the dependency graph.

5. The method of claim 4, further comprising mapping the lower-level operations to one or more quantum-computing circuits, wherein the potential restrictions of the hardware of the quantum-computing device comprise at least one of reversibility, bounds on circuit delay, or bounds on area.

6. The method of claim 5, further comprising using a cost metric to improve a space cost of the mapped one or more quantum-computing circuits.

7. The method of claim 6, wherein the improvement reduces a cost of a reversible circuits in the one or more quantum-computing circuits.

8. The method of claim 1, wherein the lower-level program that is executable by the quantum-computing device implements a ripple-carry adder comprising full adders.

9. The method of claim 4, wherein the intermediate representation of the high-level description of the quantum program is generated using one or more domain-specific libraries.

10. The method of claim 1, further comprising:
determining if a reversible dependency graph is to be generated; and
when a reversible dependency graph is to be generated, determining and applying a pebbling strategy to quantify a number of qubits needed by the quantum-computing device in time and/or space.

11. One or more computer-readable media storing computer-readable instructions, which when executed by a classical computer, cause the classical computer to:
receive a high-level description of a quantum program to be implemented in a quantum-computing device; and
compile at least a portion of the high-level description of the quantum program into a lower-level program that is executable by the quantum-computing device,
wherein the high-level description of the quantum program to be implemented in the quantum-computing device has instructions comprising loops and branches, and
wherein the compiling comprises:
converting the high-level description of the quantum program into a straight-line program, the converting comprising removing all the instructions for loops and branches from the high-level description, the straight-line program comprising at least one of conditional move, load, or store instructions for the removed loops and branches,
converting the straight-line program into a dependency graph,
translating the dependency graph to a graph of lower-level operations comprising Boolean operations and variables, and
mapping the lower-level operations to at least one quantum-computing circuit, the mapping comprising taking into account potential restrictions of hardware of the quantum-computing device.

12. The one or more computer-readable media of claim 11, wherein the compiling uses one or more of constant-folding or reassociation.

13. The one or more computer-readable media of claim 11, wherein the compiling further comprises using a cost metric to improve a space cost of one or more quantum-computing circuits of the quantum-computing device.

14. The one or more computer-readable media of claim 13, wherein the compiling further comprises using a cost metric to reduce a number of reversible-circuit operations in the one or more quantum-computing circuits.

15. The one or more computer-readable media of claim 11, wherein the lower-level program that is executable by the quantum-computing device implements a ripple-carry adder comprising full adders.

16. A system, comprising:
a quantum computing device; and
a classical computing device in communication with the quantum computing device, the classical computing device being programmed to perform a method comprising:
receiving a high-level description of a non-straight-line program to be implemented in the quantum-computing device;
using one or more compiler optimizations to convert the non-straight-line program into a straight-line program, the one or more compiler optimizations removing one or more if-branches from the non-straight-line program, at least one of the if-branches being transformed into a conditional move, store, or load instruction; and compiling the straight-line program into a lower-level quantum-computing program executable by the quantum-computing device, the compiling comprising:
converting the straight-line program into a dependency graph,
translating the dependency graph to a graph of lower-level operations comprising Boolean operations and variables, and
mapping the lower-level operations to at least one quantum-computing circuit, the mapping comprising taking into account potential restrictions of hardware of the quantum-computing device.

17. The system of claim 16, wherein the if-branches are transformed into conditional moves, stores, and loads.

18. The system of claim 16, wherein the compiling the straight-line program into the lower-level quantum-computing program comprises:
translating one or more non-Boolean operations in the dependency graph into a sequence of Boolean operations.

19. The system of claim 16, wherein the one or more compiler optimizations further comprise removing a loop from the non-straight-line program.

\* \* \* \* \*